Jan. 20, 1925.

A. A. KENT 1,523,832

VARIOMETER

Original Filed July 3, 1922

INVENTOR.
Arthur Atwater Kent
BY Cornelius D. Ehret
his ATTORNEY.

Patented Jan. 20, 1925.

1,523,832

UNITED STATES PATENT OFFICE.

ARTHUR ATWATER KENT, OF ARDMORE, PENNSYLVANIA.

VARIOMETER.

Application filed July 3, 1922, Serial No. 572,400. Renewed November 7, 1924.

*To all whom it may concern:*

Be it known that I, ARTHUR ATWATER KENT, a citizen of the United States, residing at Ardmore, county of Montgomery, and State of Pennsylvania, have invented certain new and useful Improvements in Variometers, of which the following is a specification.

My invention relates to variometers, vario-couplers and the like, comprising relatively rotatable coil structures utilizable for varying the inductance or the transformer coupling of systems employing fluctuating or alternating current, and particularly high frequency current or oscillations, as in systems of radio telephony, telegraphy and the like.

My invention resides in relatively rotatable coils of variometers of vario-couplers, or the like, and their supports or mountings, in combination with dial and pointer structure, and means for effecting relative rotation between the coils.

My invention resides in apparatus of the character hereinafter described and claimed.

For an illustration of an example of my invention, reference may be had to the accompanying drawings, in which.

Figure 1:
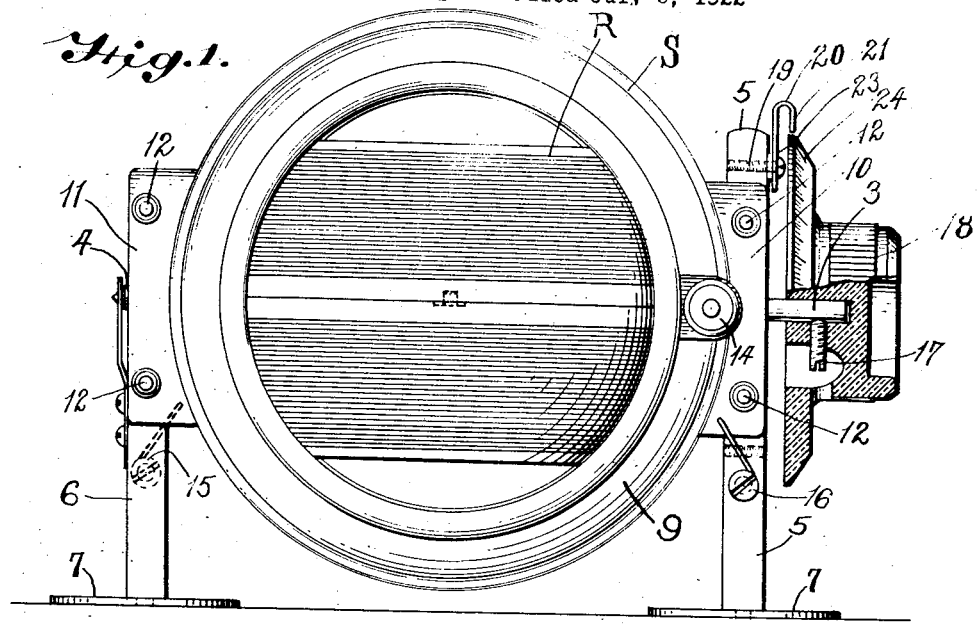
Fig. 1 is a side elevational view, partly in section, of apparatus embodying my invention.
Figure 2:
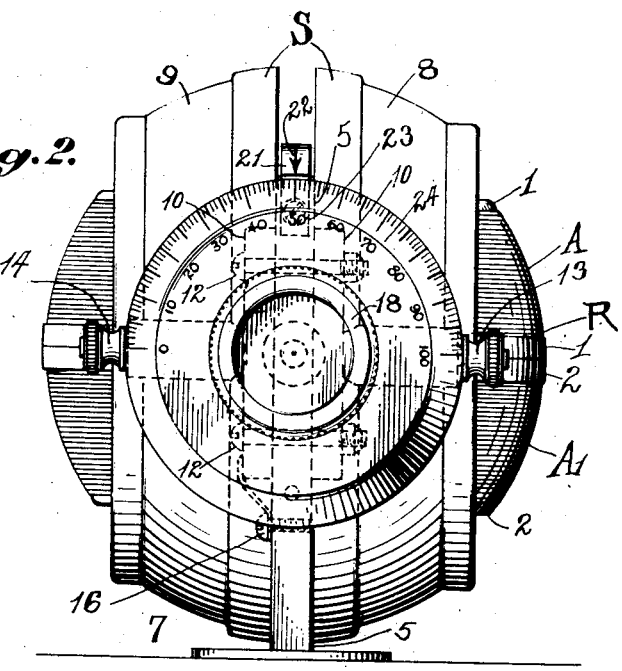
Fig. 2 is an end elevational view of the apparatus shown in Fig. 1.

Referring to the drawing, R is the rotor or rotatable coil structure comprising the coil-supporting members 1 and 2, upon which are disposed, respectively, the coils or windings A, A¹, connected in series with each other, the terminals of the rotor winding being connected to different shaft sections 3 and 4, insulated from each other and rotating as a unit. The rotor structure R is secured upon the shaft 3, 4, which latter has bearings upon or in the vertically extending metal posts 5 and 6, provided with the pedestals 7, by which they may be secured to horizontal or any other suitably positioned support.

The stationary coil structure or stator S comprises the two coil-supporting members 8 and 9, each provided on opposite ends thereof with the integral extensions 10 and 11, secured flatwise by the bolts or screws 12 to the posts 5 and 6, the post 5 being disposed between and spacing the extensions 10 from the same ends of the stator members 8 and 9, and the post 6 being disposed between and spacing the extensions 11 on the opposite ends of the stator members 8 and 9.

On the inside spherical surfaces of the stator members 8 and 9 are disposed stator windings or coils, one terminal of one of which connects with a binding post 13 and one terminal of the other of which connects with a binding post 14, carried, respectively, by the stator members 8 and 9. The other terminal of the winding carried by the stator support 8 connects with the post 6 at 15, Fig. 1, while the other terminal of the winding carried by the stator support 9 connects to the post 5 at 16, whereby the rotor windings A, A¹ and the stator windings are connected in series with each other, the binding posts 13 and 14 forming the terminals of the instrument.

Secured upon the shaft section 3 by any suitable means, as a set screw 17, is the handle or knob 18 for rotating the rotor R with respect to the stator S.

Secured upon the upper end of the post 5 by screw 19 is the index member 20, having a downwardly bent or extending portion 21, on which is disposed an index mark or pointer 22, the downwardly extending portion 21 being spaced from and shorter than the upwardly extending portion 23 of the index member.

Secured to the shaft section 3, or, as indicated, integral with or secured to the knob or handle 18, is the dial plate 24, having suitable graduations, the dial 24 rotating adjacent the downwardly extending portion 21 of the index member 20, the pointer or index 22 thereon co-acting with the scale inscribed upon the dial 24 for indicating to the operator the angular position of the rotor R with respect to the stator S.

What I claim is:

1. Apparatus of the character described comprising posts spaced from each other, stator members secured to said posts and spaced from each other by said posts, a rotor, a shaft therefor carried by said posts, said shaft having an extension to one side of one of said posts, an index member secured to said one of said posts, and a co-acting dial member secured to said extension of said shaft.

2. Apparatus of the character described comprising posts spaced from each other, stator members secured to said posts and spaced from each other by said posts, a rotor, a shaft therefor carried by said posts, said shaft having an extension to one side of one of said posts, an index member secured at its one end to said one of said posts and having a spaced portion extending toward said shaft extension, and a co-acting dial member secured to said shaft extension.

3. Apparatus of the character described comprising a stator structure, parallel posts spaced from each other and supporting said stator structure, rotor structure, shaft structure therefor carried by said posts, said shaft structure having a portion extending through one of said posts to the side thereof remote from said rotor structure, an index member secured to said one of said posts on the side thereof remote from said rotor and having a portion spaced from said post and extending toward said shaft extension, and a dial secured to said shaft extension co-acting with said portion of said index member and similarly spaced from said post.

4. Apparatus of the character described comprising a stator structure, parallel posts spaced from each other and supporting said stator structure, rotor structure, shaft structure therefor carried by said posts, said shaft structure having a portion extending through one of said posts to the side thereof remote from said rotor structure, an unitary dial and handle secured to said shaft extension, and an index member secured to said one of said posts and having an end spaced from said post and extending toward said shaft extension and terminating adjacent said dial.

In testimony whereof I have hereunto affixed my signature this 30th day of June, 1922.

ARTHUR ATWATER KENT.